Nov. 2, 1954
E. G. RAGATZ
2,693,350
CONSTRUCTION FOR HANDLING VAPORS AND LIQUIDS
AS IN BUBBLE COLUMNS OR THE LIKE
Filed July 14, 1951
2 Sheets-Sheet 1
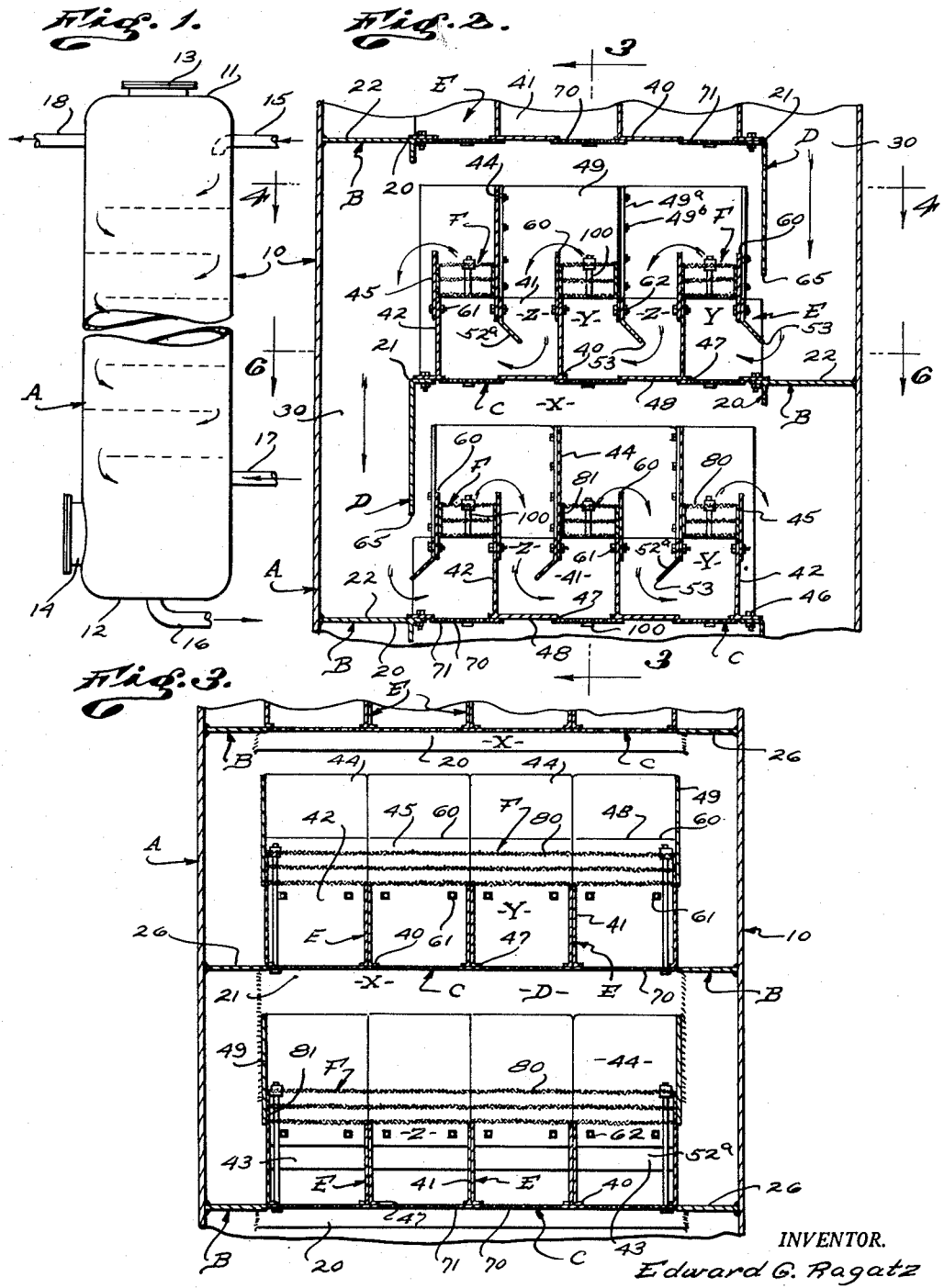
INVENTOR.
Edward G. Ragatz
BY
Attorney

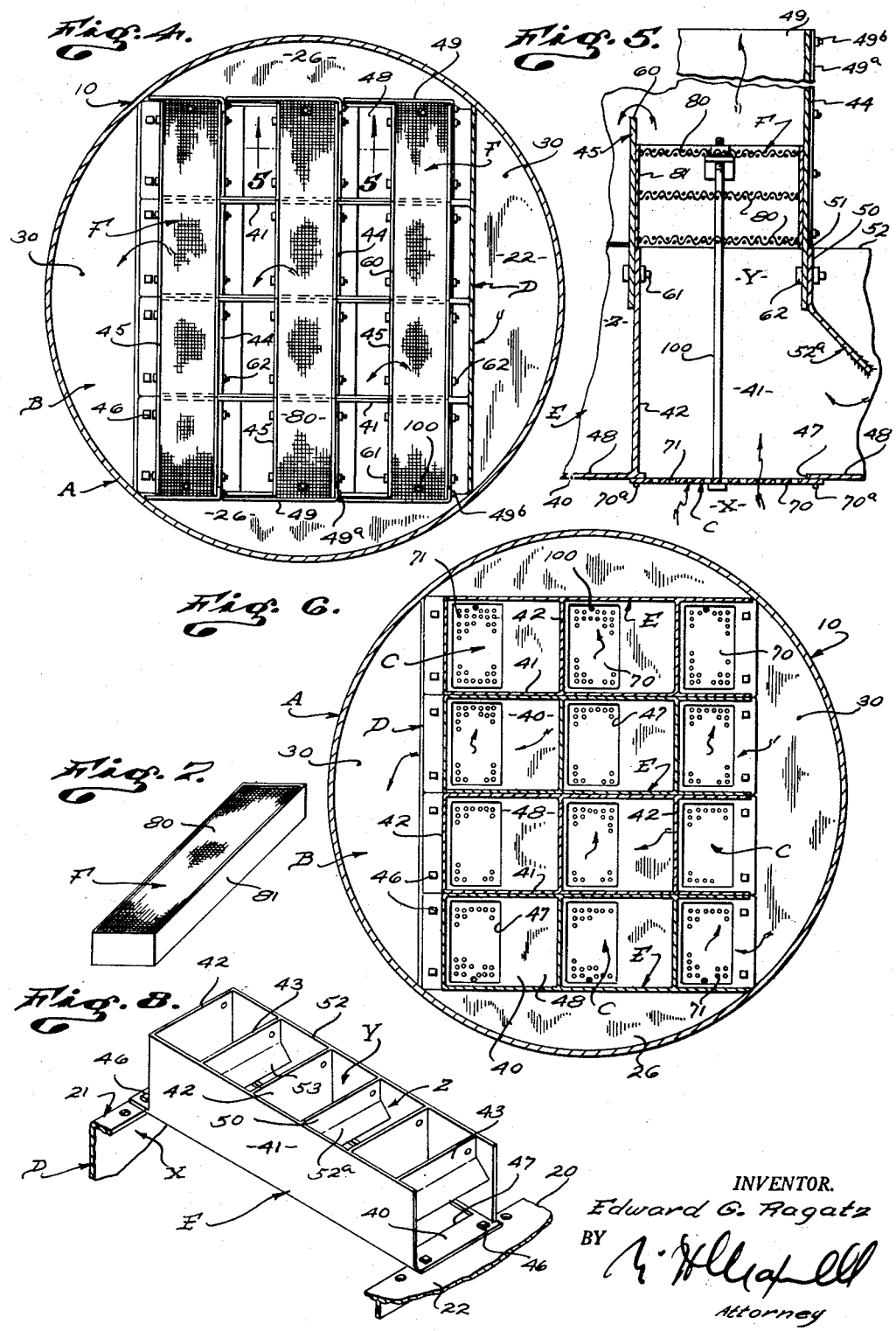

United States Patent Office 2,693,350
Patented Nov. 2, 1954

2,693,350

CONSTRUCTION FOR HANDLING VAPORS AND LIQUIDS AS IN BUBBLE COLUMNS OR THE LIKE

Edward G. Ragatz, San Marino, Calif., assignor to Edw. G. Ragatz Co., San Marino, Calif., a partnership Application July 14, 1951, Serial No. 236,742

7 Claims. (Cl. 261—114)

This invention is concerned with a construction for handling liquids and vapors as in distillation or absorption columns, such as are commonly termed bubble columns, and it is more specifically concerned with the flowing of liquids and vapors in contact with each other and with the formation and construction of the trays for bubble columns, or the like, it being a general object of the invention to provide a simple, practical method and to provide a tray structure that handles liquid and gases or vapors in a manner to effectively expose such elements to intimate and extended contact with each other under the flow and pressure conditions encountered in apparatus of this character.

Distillation and absorption columns are used extensively for effecting component interchange between liquids and vapors in process operations such as those associated with the treatment or refining of petroleum fractions. In such process operations it is necessary that an intimate and extended contact be maintained between counter-flowing streams of vapors and liquid, and in such typical situations the liquid is introduced to flow downward by gravity through the apparatus, while the vapors are forced to flow upwardly in a counter direction by application of appropriate pressure on the incoming vapor stream.

Trays equipped with various arrangements and combinations of caps, baffles and other similar elements are employed in such columns to effect the vapor dispersion and intimate vapor-liquid contacting required for effective component interchange between the counterflowing vapor and liquid streams. In spite of the efforts that have been expended on this problem, the usual structures of this general character often fail to achieve the maximum potential of component interchange, in that there is not a sufficiently prolonged contact maintained between the vapors and liquid on the individual trays, there is not a satisfactory or effective utilization of the pressure energy available in the vapor stream for increasing the intimacy of contact, and there is not a satisfactory or effective suppression of eddy currents or short circuits in the materials on the tray.

It is a general object of this invention to provide a structure of the general character referred to having a tray construction such that there is an intimate and prolonged vapor-liquid contact established and maintained at the tray in the course of flow of liquid over the tray and flow of vapor through the tray.

It is another object of this invention to provide a tray construction of the general character referred to which effectively utilizes velocity energy available in the upflowing vapor stream for maintaining intimate contact with liquid encountered on the tray, and for inducing a desired flow of said liquid across the tray.

Another object of this invention is to provide a tray construction of the general character referred to in which the liquid and vapor handling parts are so formed and related as to effectively suppress short-circuiting or channeling such as tends to occur in structures of this general character.

It is another object of this invention to provide a structure of the general character referred to in which the trays are such that they so handle the liquid and vapors as to make possible a column construction in which the trays may be located in close proximity to each other without impairing the overall action.

Another object of this invention is to provide a structure of the general character referred to wherein a maximum of vapor-liquid contact is attained by introducing vapors into a cross-flowing stream of semi-coalesced liquid (as by the passage of the vapor through a perforated plate from which the vapor jets), followed by a parallel flow of the resultant vapor-liquid mixture through a confined passageway in a direction different from the initial flow of semi-coalesced liquid. With the preferred structure of the present invention, the upwardly flowing or jetting vapors are initially contacted with horizontally flowing semi-coalesced liquid, after which the combined vapor-liquid stream flows in a vertical direction through a confining passageway under maintained turbulent conditions for an appreciable period of time.

Another object of the invention is to provide a tray construction of the general character referred to by which an initial high degree of dispersion of vapor, as in the form of small jets or bubbles, is effected in the tray liquid in such manner as to maintain intimate vapor-liquid contact for an appreciable period of time over a very wide range of vapor volume-flow.

Another object of the invention is to provide a tray of the general character referred to in which vapor is initially dispersed in or throughout a body of semi-coalesced liquid and the resultant mixture then so handled or flowed that the vapor remains in intimate contact with the liquid for an appreciable period of time, with any tendency to channel or separate being checked by positive mechanical means.

It is another object of this invention to provide a tray characterized by a series of sections resulting in the establishment of vertical passageways through which the cross-flowing liquid mus pass one after the other, while vapor flow is maintained in alternate said passageways in a manner to induce the desired liquid flow and to maintain intimate and prolonged contact between the liquid and vapors.

Another object of this invention is to provide a tray construction of the general character referred to involving baffles over and under which the liquid must flow in passing horizontally across the tray, thus giving the liquid stream as a whole an undulating movement in which vapors are contacted and flowed with the upwardly moving portions but are excluded from the downwardly moving portions.

It is a further object of the invention to provide a tray of the general character referred to across which a vertically undulating flow of liquid is maintained, and in which the alternate downwardly flowing portions of the liquid stream are coalesced to develop pressure or head which coacts with vapors flowing upward through the tray to the end that an intimate dispersion of vapors may be effected and maintained in the upwardly flowing portions of said liquid stream.

It is a further object of this invention to provide a tray construction of the general character referred to in which uniform and substantially equal flow of vapors occurs at all portions of the tray through which the vapor flows, making it unnecessary to resort to stepped or sloping construction such as is common in devices of this general character.

It is a further object of the present invention to provide a tray construction of the general character referred to wherein the parts or structural features by which the desired action is gained are simple, inexpensive of manufacture, such that they can be readily handled in a typical tower construction, and such that variations or adaptations can be readily made to meet varying working conditions.

The present invention is such that it can be applied to or carried out in connection with an ordinary column consisting of an elongated, vertical, round, shell-like body, and the various elements entering into the invention are such that they can be introduced into the column through the usual manholes and the construction is such as to handle materials such as liquid and vapors in the general manner common in this art, for instance, the liquid may be introduced at the top of the column so that its passage or flow in the apparatus is downward by reason of the action of gravity, while the vapors may be introduced in the lower portion of the column and at a substantial pressure to flow upward through the column and finally issue through an outlet at the top or upper portion of the column.

The invention provides trays in the column and these are preferably horizontally disposed and spaced apart vertically, adjacent trays being oppositely related to the end that the general stream of liquid follows a zigzag course as it passes through the column. In accordance with the present invention each tray has a bottom that receives liquid from the tray above at a point adjacent one side of the tower, and the flow of liquid is generally horizontally across the tray to the opposite side of the tower where the bottom has an opening, allowing downward flow to the tray below.

In general the invention provides a tray of trough-like construction involving partitions, upper and lower baffles, and weirs related to form a series of horizontal passageways through which the liquid flows adjacent the bottom of the tray, and a series of vertical passageways through which the liquid first flows upwardly and then over a dividing weir to flow downwardly to the next horizontal passageway adjacent the tray bottom, where it flows horizontally to enter the next vertical passageway. Openings are provided in the tray bottom beneath the vertical passageways in which the liquid flows upwardly, and vapor handling elements such as plates perforated to have jet openings pass vapors from beneath the bottom so that the vapors jet into the horizontally flowing liquid stream as it turns to enter the vertical passageway where the liquid and vapors mingle and flow upwardly together for an appreciable period of time.

The invention provides means in the upwardly flowing channel to effect intimate mixing of the liquid and vapors so that a prolonged and intimate contact is maintained until the top of the passage way is reached, at which point the remaining vapors separate to pass upward into the tray above, while the liquid overflows into the adjacent vertical passageway for downflow into the next adjacent low-level horizontal passageway. During this downflow period additional vapors are released from the liquid stream, which release, in turn, provides for additional hydrostatic "head" for forcing the cross-flowing liquid into the next adjacent vapor-contacting passageway.

Each tray is provided at its discharge end, or at the point where the liquid ultimately overflows from the tray, with a depending apron of substantial extent which coacts with the wall or shell of the column to form a liquid conduit beneath the tray from which upflowing vapors are excluded, and which serves to conduct the downflowing liquid onto the tray below.

The various objects and features of my invention will be fully understood from the following detailed description of a typical preferred form of construction and a typical manner of carrying out the method of the invention, throughout which description reference is made to the accompanying drawings, in which:

Fig. 1 is a view of a simple form of bubble column with trays indicated generally to show the zig-zag nature of flow of liquid in the column as the liquid passes from the top to the bottom thereof. Fig. 2 is an enlarged detailed vertical sectional view of a portion of a column employing the subject invention, taken to show the manner in which adjacent trays are related to get the general zig-zag flow, and showing the tray construction by which undulating liquid flow occurs on or across each tray. Fig. 3 is a vertical detailed sectional view taken as indicated by line 3—3 on Fig. 2. Fig. 4 is a detailed plan section taken as indicated by line 4—4 on Fig. 2. Fig. 5 is an enlarged view of a portion of the structure as shown in Fig. 2. Fig. 6 is a plan section taken as indicated by line 6—6 on Fig. 2. Fig. 7 is a perspective view of a unit that can be employed in the construction as the means by which intimate comingling of the vapors and the liquid is gained during vertical upward flow, and Fig. 8 is a fragmentary perspective view of a portion of the structure to illustrate certain basic elements of a typical trough unit employed in the construction of the tray.

In a typical embodiment or adaptation of the present invention it is employed to effect intimate contacting of counterflowing streams of liquid and gas, or liquid and vapors, and although a solid stream of liquid may be initially introduced into the apparatus it will not remain in that form, but, rather, will take the form of a froth or semi-coalesced liquid; and even though dry gas may be initially introduced into the apparatus, it will not remain in that form but, rather, will become wet and in the nature of a vapor. Because of such circumstances I will use the term liquid in referring either to liquid in its ordinary or solid form, or in a frothy or semi-coalesced state wherein it carries or may have mechanically combined with it a substantial volume of gas, and I will employ the term vapor to include gases, or vapors, or mixtures of the two.

In the drawings the present invention is shown as applied to or incorporated in an ordinary or conventional bubble column such as A, and it provides such column with a plurality of trays. The particular column illustrated involves a vertical cylindrical shell 10 closed at its upper end by a top 11 and at its lower end by a bottom 12. An upper manhole connection 13 provides access to the trays within the column and is normally closed, while a bottom or lower manhole connection 14 provides access at the lower portion of the column and is also normally closed. It is to be understood that various ducts or lines can be connected to the column as required for its operation, as can various gauges, fittings, and other accessories. In the drawings I have shown a liquid supply line 15 introducing liquid into the upper end portion of the column, while a drain line 16 at the bottom of the column carries off liquid at that point. A vapor supply line 17 supplies the column with vapor at the lower portion while a vapor outlet line 18 passes gas out of the upper portion of the column. It is to be understood that various connections or suitable provisions may be made for the draining of fractions from the column at suitable points, as circumstances may require, all in the manner common to structures of this general character.

In accordance with the general arrangement of parts contemplated by the present invention a plurality of like horizontally disposed trays is provided in the shell-like body 10 of the column, and these trays are spaced apart vertically and adjacent trays are oppositely disposed, as clearly shown in Fig. 2 of the drawings. This general arrangement or relationship of trays is common to structures of this general character and results in a downward zig-zag flow of liquid under the influence of gravity.

Since the several trays included in the structure are or may be alike, I will proceed with a description of but one tray, it being understood that such description is applicable to the several trays.

In the following detailed description of the tray construction I will make reference to features of construction or details which are not necessarily in any way limitations upon the present invention, but which are set forth merely as illustrative of one typical and practical manner in which the invention can be carried out. Referring to Fig. 2, the tray assembly involves, generally, several trough units E supported by a tray bottom B, vapor inlet and directing elements C carried by trough units E, liquid-vapor mingling devices F related to the troughs, an apron D carried by bottom B and depending therefrom, and various other elements as will be hereinafter set forth.

In a simple form of construction the bottom B involves two spaced parallel horizontally disposed beams 20 and 21 having upper flanges in a common horizontal plane and located in opposite directions from the central vertical axis of the column, so that the beam 20 is located at what will be termed the liquid receiving end of the tray, while the beam 21 is at the liquid discharge end of the tray. The beam 20 is spaced inward from the shell or wall of the column at one side thereof, and a plate portion 22 of the bottom continues from the horizontal flange of the beam 20 to the said side of the tower, forming a portion of the bottom which is imperforate or completely closed and which is directly beneath or in the path of the liquid discharge from the tray above. The beam 21 is spaced somewhat from the wall of the column at a point diametrically opposite that engaged by the bottom plate 22, and the space between the beam 21 and the adjoining wall portion of the column shell is left open and forms an opening through which liquid discharges from the tray to the tray below. In a form of construction embodying the invention and employing trough units such as I will describe, the trough units are combined to form a structure that is rectangular in plan configuration and the trough units extend in the direction of liquid flow across the tray or from beam 20 to beam 21. In width the assembly of troughs or trough units corresponds to the lengths of the beams 20 and 21, and the spaces that would otherwise occur at the bottom of the tray between the outermost sides of the assembly of trough units is closed or sealed by side plates 26 which extend between the ends of the beams and which join to the sides of the tower to complete the bottom structure B, as clearly illustrated in Fig. 4 of the drawings.

The apron D of the tray structure is preferably a flat vertically disposed plate that depends from or is in the nature of a continuation of the vertical flange of beam 21. It is attached at its sides to the column shell and extends a substantial distance downward from beam 21 to establish a liquid discharge passageway 30 from the tray to the tray below.

The several parts of the bottom and the apron D, as hereinabove described, namely, the beams 20, 21, and the plates 22 and 26, together with the apron, are permanently related and established in the shell 10 of the column, as by welding or other suitable fastening means.

The present invention can be advantageously carried out by employing one or more trough units E and, in practice, it is desirable to employ a plurality of trough units, in which case the several trough units may be alike and are such as to assemble into a group or body which covers or occupies the opening that occurs in the bottom B between beams 20 and 21 and the side plates 26. Since the several trough units E employed in the tray may be alike, or essentially alike, I will describe one, it being understood that such description is applicable to all.

The trough unit E is essentially an elongate trough-like structure and in the case illustrated it is characterized by a rigid or unitary assembly to which other elements are attached. The assembly illustrated in the drawings involves a trough bottom 40, sides 41, partitions 42 and lower baffles 43. The elements attached to the unitary assembly and forming a part of the trough unit include upper partitions 44 and overflow weirs 45.

The bottom 40 of the trough is preferably a simple, flat plate, rectangular in plan configuration, of substantial length, and it extends from beam 20 to beam 21 and has its ends fixed or anchored to the beams as by suitable fastening devices 46. The bottom 40 is characterized by a plurality of openings 47 which may be rectangular in plan configuration and such as to extend substantially completely across the trough or from one side to the other of the trough, the openings 47 being spaced apart longitudinally of the bottom, one being spaced a short distance from the receiving end of the trough, another spaced a short distance from the discharge end of the trough, and one or more being located between those near the ends of the trough. Adjacent openings 47 are spaced a substantial distance apart lengthwise of the trough so that the trough has solid or imperforate portions 48 of substantial extent between adjacent openings.

The sides 41 of the trough may be simple, flat, vertically disposed plate-like parts that project up from the longitudinal edges of the bottom 40 in the manner shown throughout the drawings. The partitions 42 may be simple, flat, vertically disposed plate-like parts which project up from the bottom and they extend transversely of the trough or between the sides 41, and they may be coextensive vertically with the sides of the trough. In the preferred arrangement there is a partition 42 located adjacent or close to the edge of each opening 47 toward the discharge end of the trough, as clearly illustrated throughout the drawings. The lower baffles 43 extend transversely of the trough between the sides 41 and they are spaced from the partitions 42 and are located between the partitions 42 establishing the trough with a vertical passageway or channel Y immediately above each opening 47 in the bottom, and a vertical channel Z forward of each passageway Y, or immediately above each imperforate portion 48 of the bottom 40. In the preferred form of construction each lower baffle has an upper portion 50 which is flat and vertically disposed and which is connected between the sides 41 so that its upper edge 51 is flush with the upper edges 52 of the sides 41. The vertical portion 50 extends down in the trough from the top of the sides a limited amount, and the baffle has a lip portion 52ª that extends down from the vertical portion 51 and toward the receiving end of the trough, so that it overlies an imperforate portion 48 of the trough bottom 40. The lower edge 53 of the lip portion 52ª forms a part or weir beneath or around which liquid flowing down in the adjacent duct Z passes to flow horizontally or forward at the bottom of the trough and then upward into the adjacent passageway Y. The inclined or pitched condition of the lip 52ª, as clearly shown in Fig. 2 of the drawings, causes the upper portion of the duct Z to be, in effect, a funnel-like opening that directs liquid downwardly toward the bottom of the trough and at the same time forms a flaring passageway entrance into the passageway accommodating the flow of liquid that passes beneath the baffle and is mixed with vapor, as will be hereinafter described.

There is a weir plate 45 attached to and projecting upward from each partition 42 and, in effect, forming a vertical extension or continuation of the partition. Each weir plate has a straight horizontal upper edge 60 horizontally disposed and over which liquid flows after passing upward through passage Y. In the case illustrated the weir plates are formed separate from the partitions and are secured thereto as by screw fasteners 61.

The upper baffles 44 are in the nature of flat vertically disposed plates attached to the lower baffles, and they project upwardly therefrom. In the case illustrated the upper baffles are formed separate from the lower baffles and are secured thereto by suitable screw fasteners 62. The upper baffles 44, at least those on all but the lower baffle at the receiving end of the trough, project up to a point well above the weir plates 45, as clearly illustrated in Fig. 2 of the drawings.

The weir plates 45 and the upper baffles 44, by projecting upward from the parts 42 and 43, in effect extend the passageways Y vertically above the upper edges 42 of the sides of the trough, and as a result the passageways Y are of substantial extent vertically, as shown throughout the drawings. Further, in the preferred relationship of parts adjacent trays are related so that the lowermost edge 65 of one tray apron D depends below the upper edges 60 of the weirs or weir plates 45 of the tray below, and the difference between the vertical extent of the weir plates and the upper baffles is such that there is no flow of liquid over the upper baffles, but only over the weir plates, all with the result that the general stream or flow of liquid from the receiving end of the trough to the discharge end thereof is vertically undulating, as indicated by the arrows in Fig. 2 of the drawings.

In carrying out the invention the weir plates 45 and the upper baffles 44 for each trough unit may be limited to that particular trough unit or coextensive in length with the width of the trough unit, or where several trough units are employed the weir plates and the upper baffle plates 44 can be of such extent as to extend continuously across the entire assembly of trough units.

It is preferred, in practice, to provide end plates 49 at the ends of the upper baffles 44 to check any tendency for flow to occur laterally or transversely of the troughs. The plates 49 may be flat vertical plates that extend up from the side walls of the troughs and between the ends of adjacent upper baffles. I have shown the plates 49 provided with flanges 49ª secured to the ends of the baffles 49 by fasteners 49ᵇ. There may be plates 49 at, or projecting up from, each side wall. Where there is a group or series of troughs arranged side by side, as I have shown in the drawings, the desired control or direction of flow may be gained by merely providing plates 49 at the end or outermost side walls of the group of troughs as I have shown in the drawings. It will be noted from the drawings that the several plates 49 related to a particular side wall combine to form a flow controlling means extending continuously from the wall of the column at the receiving end of the trough structure to the wall of the column at the discharge end of the trough structure.

The vapor inlet and directing means C provided by the present invention involves a perforated plate 70 at the bottom of the trough occupying or covering the openings 47, it being preferred that there be a plate 70 at each opening 47. The plates 70 are preferably thin flat plates provided with a plurality of openings or perforations 71. The openings 71 may be varied in size, arrangement, and number, as circumstances require, it being preferred to establish the openings 71 in such number, size, and arrangement that vapor from the chamber X beneath the bottom of the plate or the bottom of the trough flows up through the plate 70 issuing in jets or fine streams into the liquid in the trough. It is to be observed that a plate 70, with perforations or jet openings 71 located at an opening 70 in the bottom of the trough, occurs directly beneath the vertical passageway Y and is so related to the adjacent inner baffle and the lip 52ᵃ thereof as to act on the horizontally flowing liquid passing beneath that baffle to cause deflection of the direction of liquid flow from horizontal to vertical with final flow up through the passage Y in the same direction that the vapor is introduced or jetted into the trough.

The liquid-vapor mingling devices F are employed in or at the vertical passageways Y, and are preferably such as to completely intercept all flow through the passageways Y to cause intimate mixing or commingling of the liquids and vapors handled by the passageways. In a preferred form of the invention each device F involves a plurality of screens 80, preferably simple, flat, horizontally disposed screens corresponding in size and shape to the plan configuration of the passageway Y. In a typical case the screens 80 are spaced apart vertically and there are several screens 80, as shown in Fig. 5 of the drawings. The desired mounting and spacing of the screens 80 can be gained in any suitable manner. In the case illustrated a suitable thin-walled case or holder 81 is provided to carry the screens 80 in the desired spaced relation and the holder is shaped to slidably fit into the upper portion of the passageway Y established by the weir plate 45 and baffle plate 44, as shown in the drawings. The holder 81 may rest on the upper edges of the sides 41 and upon the upper edge of partition 42, as shown in Fig. 5 of the drawings.

In the preferred form of the invention the several perforated plates 70 and the several mixing devices F are separate units subject to handling or manipulation free of the other parts of the construction, and a simple mounting or fastening means is provided for securing these parts in place. In the case illustrated each plate 70 is releasably secured to the trough with which it cooperates or to which it is related, as by screw fasteners 70ᵃ or the like. The liquid vapor mingling devices F are such that each one is not limited to but one trough but extends completely across the assembly of troughs. Each device F is secured or clamped in place by tie bolts 100, in the manner illustrated in Figs. 3 and 5 of the drawings.

With the construction provided by the invention as hereinabove set forth, and as shown throughout the drawings, liquid flows down from one tray to a low level on a tray below, that is, to a point where it is stopped by the bottom section 22 of the tray, from which point and at which level it flows horizontally or forward, beneath the lower edge 53 of the first lower baffle 52ᵃ. This horizontal advance or flow at low level is changed as soon as the liquid passes beneath baffle 43 by vapor flowing or jetting up through the plate 70 in register with the opening 47 adjacent the receiving end of the trough. The upward flow or jetting of the vapor not only turns the horizontal stream of liquid upwardly, but causes effective mingling or mixture of the vapor with the liquid as the direction of the liquid is changed, and as the body of liquid enters the lower end of the first passage or channel Y. The upwardly flowing or jetting vapors mixing with the cross-flowing liquid produce an intimate vapor-liquid mixture which flows vertically through the passageway Y. This mixed stream must all find its way through the mingling device F in the passageway Y, that is, all of such material must pass through the screens 80 in the course of its upward flow. As a result, any tendency for the vapors to channel or to become other than intimately mixed with the liquid is checked, and the mass remains intimately mixed in a high state of agitation throughout its flow through passage Y. The energy required for this changing in direction of liquid flow and intimate mixing and agitation of the vapor-liquid stream in passage Y, is supplied by the velocity energy of the vapor jets emerging from plate 70 and the additional hydrostatic head developed by coalescence of downflowing liquid in channel passage Z.

At the upper end of passageway Y after the mixture has passed through the device F, the major body of vapor separates from the liquid and continues to flow into the chamber X beneath the next tray, while the remaining liquid overflows the upper edge 60 of the weir plate 45 in a highly frothy state to coalesce in duct Z while flowing downward for passage beneath the lower edge 53 of the second baffle plate, to be thereafter circulated through the second vertical passageway in the manner just described. After the liquid has thus passed or undulated across the tray from the receiving end of the trough to the discharge end, it overflows the weir plate at the discharge end of the trough to flow down through passageway 30 to the receiving end of the next tray below.

It is to be recognized that in practice the vapor directing plates 70 may be varied to meet various operating conditions and it is to be recognized that these elements of the structure are very simple, are removably attached to the trough structure for ready replacement, and are such as to minimize danger of clogging or fouling. Furthermore, it will be immediately apparent that under normal conditions there will be uniform flow up through each of the plates 70 at a tray so that there is uniform action in each of the vertical passageways of the tray. It is to be observed that as a result of the structure that I have provided the vapor is, in effect, maintained in vertical flow and the energy absorbed from the vapor in the course of operation through the apparatus is, in effect, utilized in the course of effecting vertical flow of liquid on the trays, that is, in the gaining of flow of fluid upward through the passageways Y, which action is supplemented by the head of liquid that may develop in the ducts Z. It is to be observed that with the structure that I have provided the liquid is maintained on the tray for a substantial period of time, its course across the tray being tortuous and definite and such that there cannot under any circumstances be channeling in a manner to avoid being subjected to the action of vapors passed by the tray. It is also highly important to observe that as the vapors and liquid flow up through the passageways Y they are flowing together or in the same direction, with the result that there is a prolonged contact, affording ample opportunity for rectification, absorption, or other vapor-liquid action as may be desired.

Having described only a typical preferred form of construction, I do not wish to be limited or restricted to the specific details herein set forth, but wish to reserve to myself any variations or modifications that may appear to those skilled in the art and fall within the scope of the following claims.

Having described my invention, I claim:

1. A column tray handling liquid and vapor comprising means directing a shallow stream of liquid across the tray, said tray comprising alternating vapor-admitting perforate and vapor-excluding imperforate sections, a plurality of alternating weirs and baffles located transverse the direction of flow of said stream whereby all the liquid flowing across the tray flows in repeated cycles upward and over a weir and then downward and under an adjacent baffle, a perforate and imperforate section of said tray lying between adjacent weirs, with said perforate tray sections being in register with the upwardly flowing portions of said liquid stream.

2. The apparatus of claim 1, including gas-dispersing means disposed in the path of the upwardly flowing portion of said liquid stream.

3. The apparatus of claim 1 wherein said column tray comprises a plurality of sections, and means for mounting said sections in a column to form a complete tray.

4. A tray column comprising a vertical shell and a plurality of trays handling liquid and vapor disposed horizontally and at spaced intervals in said shell, said trays comprising alternating perforate and imperforate sections, a plurality of alternating weirs and baffles located transverse the direction of flow of a stream of said liquid across said trays, whereby all the liquid flowing across the trays flows in repeated cycles upward and over a weir and then downward and under an adjacent baffle, a perforate and imperforate section of said tray lying between adjacent weirs, said perforate tray sections being in register with the upwardly flowing portions of said liquid stream, a down-comer to direct said stream downwardly from one tray to the next tray below it, said downcomers being opposite disposed on adjacent trays, said shell being equipped with the usual inlets and outlets for introducing and removing vapor and liquid in counterflow contact.

5. A unit of a column tray handling liquid and vapor and including means directing a shallow stream of liquid across the tray, said unit comprising an elongate trough adapted to receive liquid flowing across the tray, said trough having vertical side walls disposed parallel to the flow of liquid across the tray, the bottom of said trough comprising alternating perforate and imperforate sections lengthwise thereof, a plurality of alternating weirs and baffles located transverse the direction of flow of said liquid stream and disposed between the side walls of said trough whereby all liquid flowing therethrough flows in repeated cycles upward and over a weir and then downward and under an adjacent baffle, a perforate and imperforate section of said tray lying between adjacent weirs, said perforate sections being in register with the upwardly flowing portions of said liquid stream, said baffles and said side walls extending higher than said weirs to check horizontal and lateral flow of the liquid, respectively.

6. The apparatus of claim 3 wherein the portions of the baffles extending above the weirs are detachably mounted on the trough.

7. A column tray handling liquid and vapor including, means directing a shallow stream of liquid across the tray, a plurality of liquid-vapor contacting sections in said tray, vapor-admitting means disposed in said contacting sections, and vapor-disengaging and liquid-coalescing sections interposed between adjacent contacting sections, said disengaging section comprising an upstream weir positioned transverse the stream flow-path over which the liquid flows to enter the disengaging section, a horizontal plate extending downstream from said weir and forming essentially an imperforate bottom portion of said tray, and a vertical baffle downstream of said weir and substantially parallel thereto under which the liquid stream must flow to enter the adjacent downstream contacting section, said baffle being positioned above said plate and of sufficient height to prevent flow of liquid over said baffle.

References Cited in the file of this patent

UNITED STATES PATENTS

| Number | Name | Date |
|---|---|---|
| 755,705 | Schanche | Mar. 29, 1904 |
| 1,700,698 | Fulweiler | Jan. 29, 1929 |
| 1,738,870 | Cox et al. | Dec. 10, 1929 |
| 1,811,247 | Smith | June 23, 1931 |
| 1,822,323 | Stover | Sept. 8, 1931 |
| 2,116,933 | Ragatz | May 10, 1938 |
| 2,378,952 | Rousseau | June 26, 1945 |
| 2,420,075 | Glitsch | May 6, 1947 |
| 2,501,114 | Whaley | Mar. 21, 1950 |
| 2,568,749 | Kittel | Sept. 25, 1951 |
| 2,582,826 | Glitsch | Jan. 15, 1952 |

FOREIGN PATENTS

| Number | Country | Date |
|---|---|---|
| 569,039 | Great Britain | May 2, 1945 |
| 878,151 | France | Sept. 28, 1942 |